US012294846B2

(12) United States Patent
Mao et al.

(10) Patent No.: US 12,294,846 B2
(45) Date of Patent: May 6, 2025

(54) EXCITER AND ELECTRONIC PRODUCT

(71) Applicant: GOERTEK INC., Shandong (CN)

(72) Inventors: Dongsheng Mao, Shandong (CN); Yongqiang Wang, Shandong (CN); Liang Xiao, Shandong (CN)

(73) Assignee: GOERTEK INC., Weifang (CN)

( * ) Notice: Subject to any disclaimer, the term of this patent is extended or adjusted under 35 U.S.C. 154(b) by 166 days.

(21) Appl. No.: 17/790,204

(22) PCT Filed: Dec. 5, 2020

(86) PCT No.: PCT/CN2020/134118
§ 371 (c)(1),
(2) Date: Jun. 30, 2022

(87) PCT Pub. No.: WO2021/135831
PCT Pub. Date: Jul. 8, 2021

(65) Prior Publication Data

US 2023/0030236 A1 Feb. 2, 2023

(30) Foreign Application Priority Data

Dec. 30, 2019 (CN) ......................... 201911397782.6

(51) Int. Cl.
*H04R 9/02* (2006.01)
*H01F 7/20* (2006.01)
*H04R 9/04* (2006.01)

(52) U.S. Cl.
CPC ............... *H04R 9/025* (2013.01); *H01F 7/20* (2013.01); *H04R 9/04* (2013.01)

(58) Field of Classification Search
CPC . H04R 1/02; H04R 1/026; H04R 9/02; H04R 9/025; H04R 9/04; H04R 9/041;
(Continued)

(56) References Cited

U.S. PATENT DOCUMENTS 5,027,412 A * 6/1991 Hayashi .................. H01F 41/10 381/409
6,421,449 B1 * 7/2002 Hasegawa .............. H04R 9/046 381/407
(Continued)

FOREIGN PATENT DOCUMENTS

CN 1388730 A 1/2003
CN 1643977 A 7/2005
(Continued)

OTHER PUBLICATIONS

International Search Report from International Application No. PCT/CN2020/134118 mailed Mar. 3, 2021.

*Primary Examiner* — Paul Kim
(74) *Attorney, Agent, or Firm* — Shih IP Law Group, PLLC

(57) ABSTRACT

The present disclosure provides an exciter and an electronic product. The exciter comprises: a magnetic circuit assembly comprising a first housing and a magnet, and the magnet is connected to the first housing; a coil assembly comprising a second housing and a coil, and the coil is disposed in a magnetic field formed by the magnet, wherein the coil assembly is configured to be capable of generating a vibration relative to the magnetic circuit assembly, the coil is formed by winding a wire having a polygonal cross section. According to the present disclosure, the coil wire has a polygonal cross section, so that an interval between the wires can be reduced in the wound coil, the number of turns of the coil is increased in the same space, the effective length of the coil is increased, and the driving force generated from the coil is increased.

7 Claims, 3 Drawing Sheets

(58) Field of Classification Search
CPC .......... H04R 9/045; H04R 9/047; H04R 9/06; H04R 9/046; H04R 9/063; H04R 2499/15; H01F 7/0205; H01F 7/0242; H01F 7/0273; H01F 7/0289; H01F 7/20; H01F 7/066; H01F 27/022
USPC .......................................................... 381/412
See application file for complete search history.

(56) References Cited

U.S. PATENT DOCUMENTS

| | | | | |
|---|---|---|---|---|
| 2003/0103642 | A1 * | 6/2003 | Kam | H04R 9/043 381/431 |
| 2006/0039578 | A1 | 2/2006 | Stiles et al. | |
| 2018/0146294 | A1 * | 5/2018 | Zhu | H04R 9/047 |
| 2020/0275190 | A1 * | 8/2020 | Cho | H04R 9/045 |
| 2021/0016321 | A1 * | 1/2021 | Yan | H04R 7/00 |
| 2021/0021935 | A1 * | 1/2021 | Yan | H04R 9/025 |

FOREIGN PATENT DOCUMENTS

| | | | | |
|---|---|---|---|---|
| CN | 106658309 | A * | 5/2017 | H04R 9/02 |
| CN | 110049416 | A | 7/2019 | |
| CN | 110113696 | A | 8/2019 | |
| CN | 111050253 | A | 4/2020 | |
| CN | 211089948 | U | 7/2020 | |
| EP | 1037502 | A2 | 9/2000 | |

* cited by examiner

EXCITER AND ELECTRONIC PRODUCT

TECHNICAL FIELD

The present disclosure relates to A technical field of acoustics, and more particularly, to an exciter and an electronic product.

BACKGROUND ART

Direct-driven exciters for sounding on display are widely used now, which enable electronic devices to generate stereo effect so that users can have a good use experience. Therefore, such products have a high degree of acceptance among the consumers.

At present, commonly used exciters include integrated exciters and separated exciters. Whether it is a separated or an integrated exciter, coils used in the exciter are made of circular cross-sectional enameled wires. For a coil wound with the circular cross-sectional enameled wires, turns of the coil are arranged tangent to each other due to the shape characteristics of the enameled wire, and an interval between two adjacent turns of enameled wire is large. In this case, the number of turns of coil is less for a certain winding space, resulting in a shorter effective length of the coil. Accordingly, the driving force the coil subjected in the magnetic field is small.

In view of the above, it is necessary to improve the coil of a conventional exciter to increase the driving force, which is relatively small.

SUMMARY

An object of the present disclosure is to provide an exciter that solves the above problem to increase the driving force of a conventional exciter, which is relatively small.

Another object of the present disclosure is to provide an electronic product including the above-mentioned exciter.

An exciter, including: a magnetic circuit assembly including a first housing and a magnet, and the magnet is coupled to the first housing; and a coil assembly including a second housing and a coil, and the coil is disposed in a magnetic field formed by the magnet, wherein the coil is coupled to the second housing, wherein the coil assembly is configured to be capable of generating a vibration relative to the magnetic circuit assembly, and wherein the coil is formed by winding a wire having a polygonal cross section.

Optionally, the wire has a rectangular cross section.

Optionally, the wire has a square cross section.

Optionally, the magnet is provided in pairs, and two magnets in each pair of magnets have the same magnetization direction.

Optionally, two pairs of magnets are arranged along a vibration direction of the coil assembly, and magnetization directions of the two pairs of magnets are opposite to each other to form a magnetic circuit.

Optionally, in the vibration direction of the coil assembly, a spacing between the two pairs of magnets is less than or equal to a height of a winding hole of the coil in the vibration direction.

Optionally, an elastic sheet is provided on the second housing, and the magnet is coupled to the elastic sheet.

Optionally, the elastic sheet is integrally formed with the second housing.

Optionally, two adjacent wires in the coil are adhered by adhesive.

An electronic product, including:

the above-mentioned exciter;

a fixed member;

a vibrating member configured to be capable of vibrating relative to the fixed member, wherein one of the first housing and the second housing is coupled to the vibrating member, and the other one of the first housing and the second housing is coupled to the fixed member.

The technical solution of the present disclosure has the following beneficial effect: the coil wire has a polygonal cross section, so that a interval between the wires can be reduced in the wound coil, the number of turns of the coil is increased in the same space, the effective length of the coil is increased, and the driving force generated from the coil is increased.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which are incorporated in and constitute a part of the specification, illustrate embodiments of the present disclosure, and serve to explain the principle of the present disclosure together with the description thereof.

Figure 1:
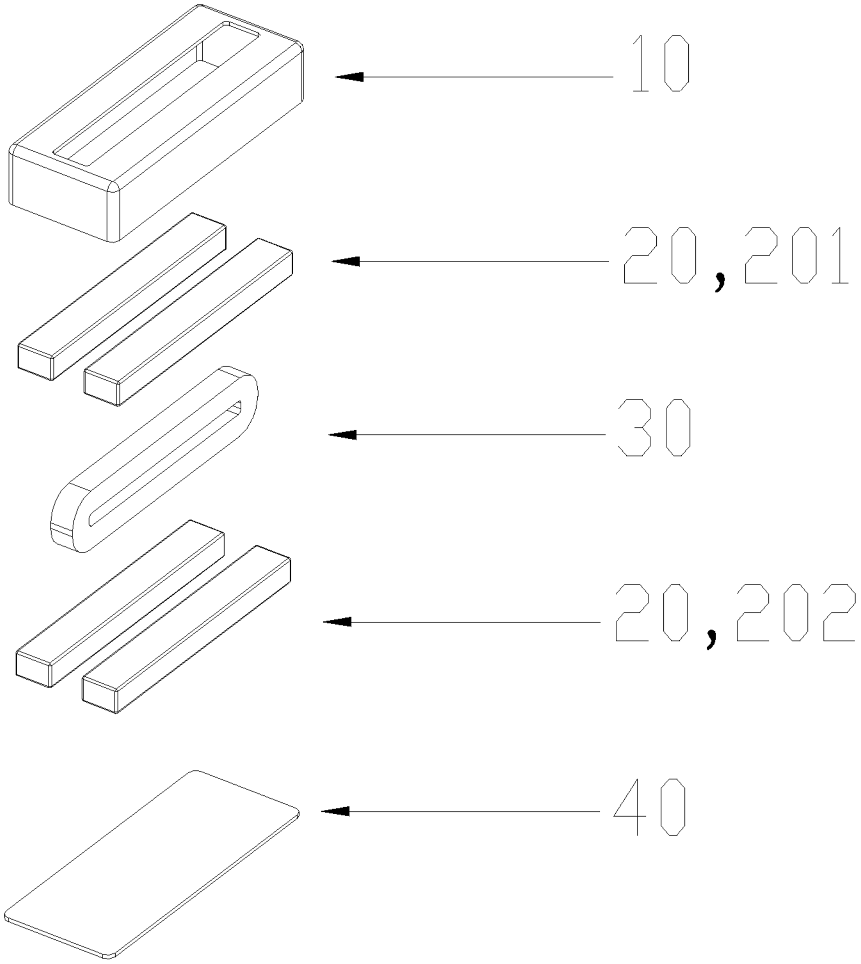
FIG. 1 is an exploded view of an exciter according to an embodiment of the present disclosure.
Figure 2:
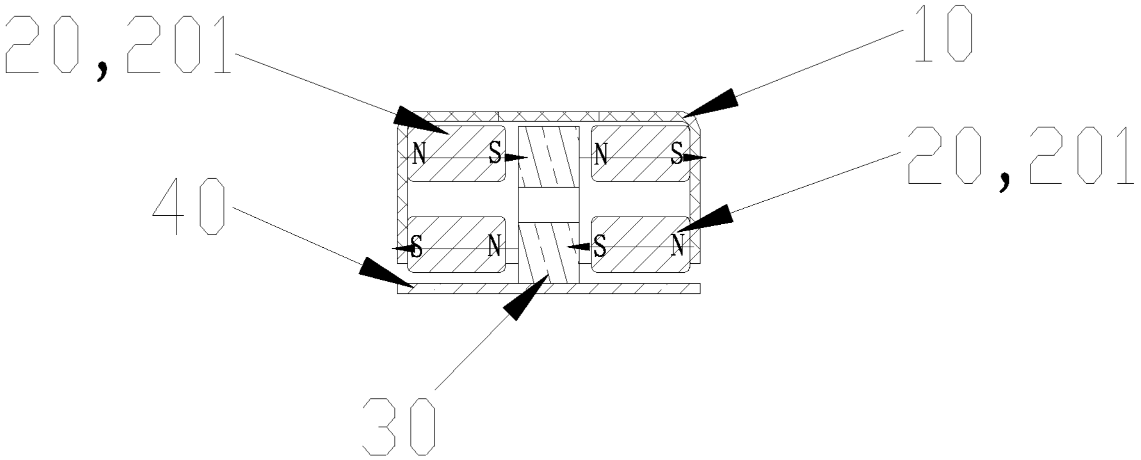
FIG. 2 is a cross-sectional view of an exciter according to an embodiment of the present disclosure.

Reference numerals: 10—first housing; 20—magnet; 201—first pair of magnets; 202—second pair of magnets; 30—coil; 301—wire; 40—second housing; 401—fixed portion; 402—elastic sheet.

DETAILED DESCRIPTION OF THE EMBODIMENTS

Various exemplary embodiments of the present disclosure will now be described in detail with reference to the accompanying drawings. It should be noted that the relative arrangement of the components and steps, the numerical expressions and numerical values set forth in these embodiments do not limit the scope of the disclosure, unless otherwise specified.

The following description of at least one exemplary embodiment is merely illustrative in fact and is not intended to limit the disclosure, its applications or uses.

Techniques, methods, and apparatus known to those skilled in the relevant art may not be discussed in detail, but where appropriate, such techniques, methods, and apparatus should be considered part of the specification.

In all examples shown and discussed herein, any specific values should be interpreted as merely exemplary and not limiting. Accordingly, other examples of the exemplary embodiment may have different values.

It should be noted that similar numerals and letters represent similar items in the following drawings. Therefore, once an item is defined in a drawing, it does not need to be further discussed in subsequent drawings.

At present, commonly used exciters include integrated exciters and separated exciters. Whether it is a separated or an integrated exciter, coils used in the exciter are made of circular cross-sectional enameled wires. For a coil wound with the circular cross-sectional enameled wires, turns of the coil are arranged tangent to each other due to the shape characteristics of the enameled wire, and an interval between two adjacent turns of enameled wire is large. In this case, the number of turns of coil is less for a certain winding space, resulting in a shorter effective length of the coil. Accordingly, the driving force the coil subjected in the magnetic field is small. In view of the above, it is necessary to improve the coil of a conventional exciter to increase the driving force, which is relatively small.

The present disclosure provides an exciter, including: a magnetic circuit assembly including a first housing and a magnet, the magnet is coupled to the first housing; and a coil assembly including a second housing and a coil, and the coil is disposed in a magnetic field formed by the magnet, wherein the coil is coupled to the second housing, wherein the coil assembly is configured to be capable of generating a vibration relative to the magnetic circuit assembly, and wherein the coil is formed by winding a wire having a polygonal cross section.

Referring to FIGS. 1-4, an exciter according to an embodiment of the present disclosure includes a magnetic circuit assembly and a coil assembly. The magnetic circuit assembly includes a first housing 10 and a magnet 20. The coil assembly includes a coil 30 and a second housing 40. Optionally, the first housing has a box-shaped structure, and the first housing is combined with the second housing to form an accommodating cavity of the exciter for accommodating various components of the exciter, such as magnets, coils, and the like. The magnet is coupled to the first housing. Optionally, the magnet is coupled to an inner sidewall of the box-shaped structure. In the present disclosure, the magnet can be bonded to the first housing by using an adhesive. The magnet forms a magnetic field, the coil is arranged in the magnetic field generated by the magnet, and magnetic induction lines of the magnet pass through the coil. The coil is coupled to the second housing. When the exciter operates, an alternating electric signal is applied to the coil, the coil in the magnetic field is subjected to an ampere force, and the coil generates a vibration relative to the magnetic circuit assembly. In the present disclosure, the magnet may be coupled to the second housing at the same time. When the magnet is coupled to the second housing at the same time, the magnet and the coil are respectively connected at different positions of the second housing, to realize a relative displacement between the magnet and the coil.

The coil of the present disclosure can be formed by winding a wire. The wire for winding the coil may be an enameled copper wire or a copper clad aluminum wire. The material of the wire is not limited. Optionally, the wire may have a polygonal-shaped cross-section. That is, the wire has a prismatic shape. By using the wires having a polygon cross section, outer surfaces of two adjacent wires may contact with each other in the wound coil, the contact area between the wires can be increased, and thus the interval between the adjacent wires can be reduced.

In the present disclosure, the coil wire has a polygonal-shaped cross-section, so that outer surfaces of the wires are in surface contact in the wound coil, the interval between the wires can be effectively reduced. As such, within the same coil volume, a winding length of the wire can be increased. According to the relationship between the driving force generated from the energized coil in the magnetic field and the length of the wire, $F=B*I*L$, where B is a magnetic field strength of the magnet, I is a current passing through the coil, and L is a length of the wire. It can be known that in the case that the magnetic field strength and the current remain unchanged, the driving force on the coil can be significantly increased when the length of the wire is increased, thereby improving the vibration performance of the exciter.

Optionally, the wire has a rectangular cross section.

As an embodiment of the present disclosure, the cross section of the wire 301 may be rectangular. When the coil 30 is formed by winding the wire with rectangular cross-section, the interval between the wires in the coil can be further reduced, and the winding length of the wire within the same winding space can be increased, thereby increasing the driving force of the magnetic field on the coil and thus improve the vibration performance of the exciter.

Optionally, the wire has a square cross section.

Figure 5:
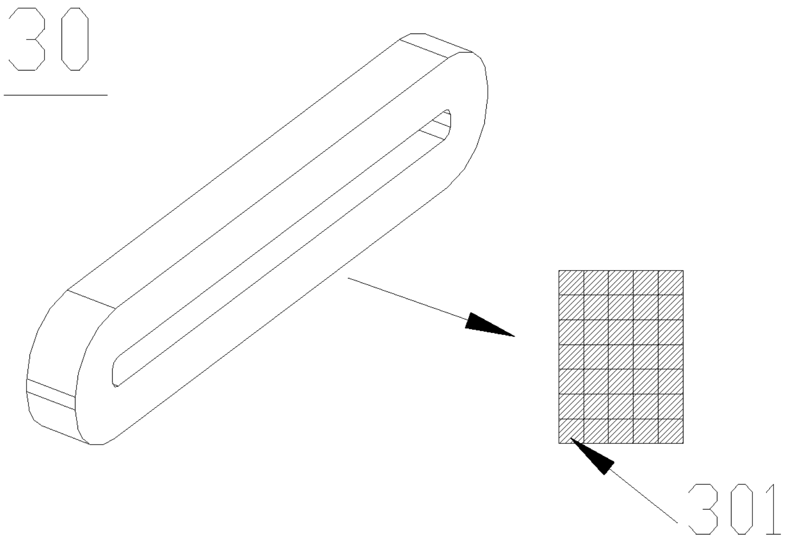
FIG. 5 is schematic view illustrating a coil and a cross section thereof according to an embodiment of the present disclosure.

As shown in FIG. 5, the wire 301 may have a square cross section, so as to improve the central symmetry of the wire. When the coil 30 is formed by winding the wire with square cross-section, it is easier to wind the wires seamlessly, reduce or even eliminate the interval between the wires, and increase the effective length of the wire in the coil, thereby increasing the driving force of the magnetic field on the coil and improving the vibration performance of the exciter. Meanwhile, the seamless stacking of wires can also improve the utilization of space.

Optionally, the magnet is provided in pairs, and two magnets in each pair of magnets have the same magnetization direction.

As an embodiment of the present disclosure, as shown in FIGS. 1-4, the magnet 20 is provided in pairs. A magnetic gap is formed between two magnets arranged in pairs. In installation, the coil 30 is disposed in the magnetic gap, so that the magnetic induction lines generated by the magnet pass through the coil. The magnets arranged in pairs can not only enhance the magnetic field strength, increase the driving force on the coil, and improve the vibration performance of the exciter, but also improve the symmetry of internal structure of the exciter, and improve the uniformity of weight distribution. Optionally, two magnets in each pair of magnets have the same magnetization direction. The magnetization directions of the two magnets 20 in pairs are the same as each other, so that N poles and S poles of the two magnets are opposite to each other. That is, the magnetic induction lines from the N pole of one of the magnets pass through the coil and then reach the S pole of the other magnet. As such, the magnetic induction lines can pass through the coil vertically, and it may increase the magnetic induction intensity in a direction perpendicular to the coil 30, thereby increasing the driving force on the coil and improving the vibration performance of the exciter.

Optionally, two pairs of magnets are arranged along a vibration direction of the coil assembly, and magnetization directions of the two pairs of magnets are opposite to each other to form a magnetic circuit.

As shown in FIGS. 1-4, according to an embodiment of the present disclosure, two pairs of magnets 20, i.e., a first pair of magnets 201 and a second pair of magnets 202 (illustrated in FIGS. 1-3), are arranged along the vibration direction of the coil assembly, i.e., the vertical direction in the drawings. The two pairs of magnets 20 can enhance the magnetic field strength generated by the magnets, thereby increasing the driving force on the coil. The magnetization directions of the first pair of magnets and the second pair of magnets are opposite to each other. Optionally, the magnetization directions of the two pairs of magnets are directed to left and right of the horizontal direction, respectively. By arranging the magnetization directions of the two pairs of magnets in opposite directions, a closed magnetic circuit may be formed, and the amount of the passing magnetic induction lines in the coil 30 may be increased, and it may be beneficial to increase the interaction between the coil and the magnet.

Optionally, in the vibration direction of the coil assembly, a spacing between the two pairs of magnets is less than or equal to a height of a winding hole of the coil in the vibration direction.

As an embodiment of the present disclosure, as shown in FIGS. 1-4, there may be a certain spaced distance between the first pair of magnets 201 and the second pair of magnets 202 in the vibration direction of the coil assembly. After the coil 30 is formed by winding the wire, a winding hole is formed in the center of the coil. The coil is installed in the magnetic gap, the winding plane of the coil is parallel to the vertical direction, and the distance between the two pairs of magnets is less than or equal to the height of the winding hole in the vertical direction. Such an arrangement can ensure that the magnetic induction lines pass through the parts with wires on the winding plane, and thus it may ensure the effective area of the coil interacting with the magnet, thereby increasing the driving force on the coil and improve the vibration performance of the exciter.

Optionally, an elastic sheet is provided on the second housing, and the magnet is coupled to the elastic sheet.

Optionally, the elastic sheet is integrally formed with the second housing.

Figure 3:
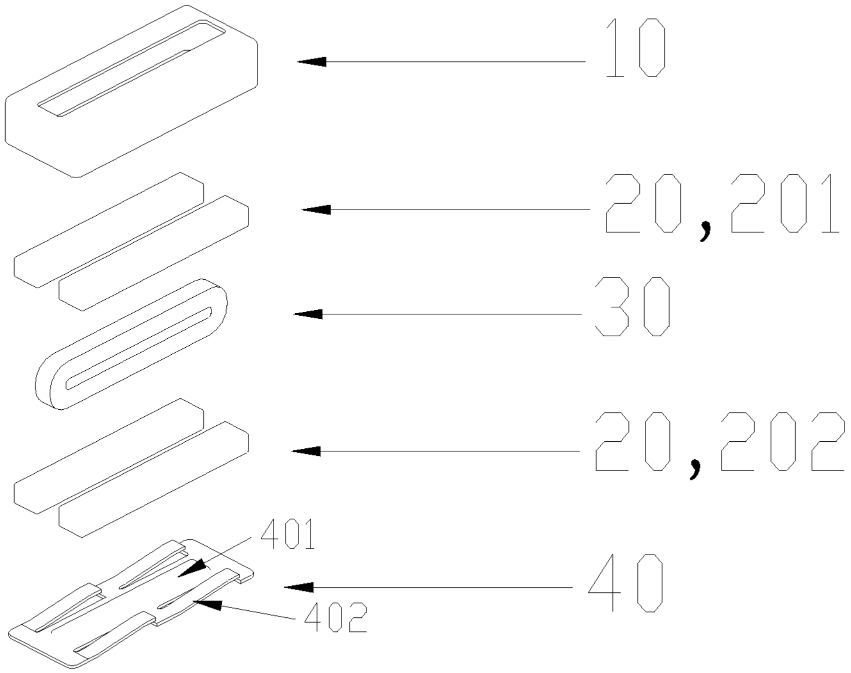
FIG. 3 is an exploded view of an exciter according to an embodiment of the present disclosure.
Figure 4:
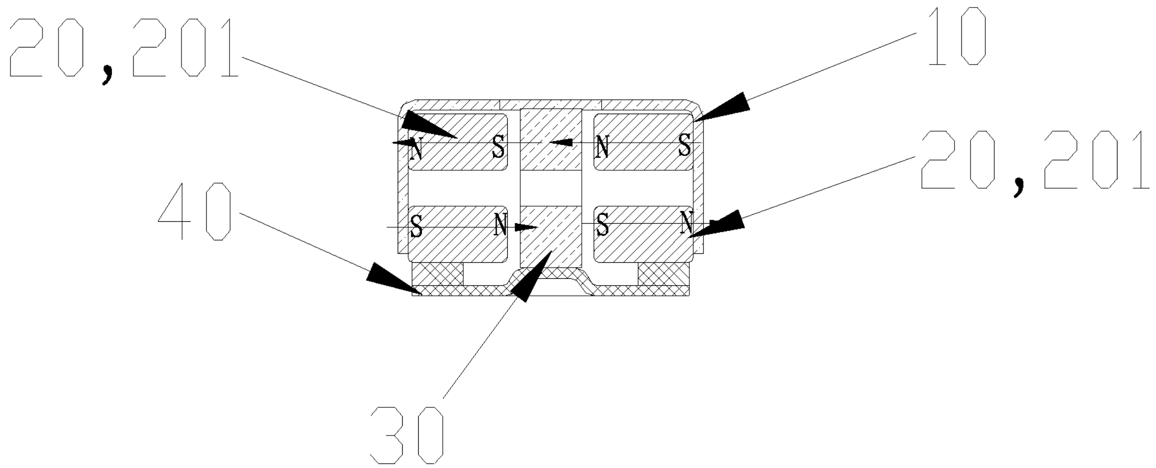
FIG. 4 is a cross-sectional view of an exciter according to an embodiment of the present disclosure.

As an embodiment of the present disclosure, as shown in FIG. 3, the second housing 40 is provided with an elastic sheet 402. The elastic sheet may be connected between the second housing and the magnet. Optionally, the elastic sheet is integrally formed with the second housing. In this case, the internal structure of the exciter can be simplified. Optionally, a fixed portion 401 is further provided on the second housing. The elastic sheet may be displaced relative to the fixed portion. Optionally, the displacement of the elastic sheet relative to the fixed portion is in the vertical direction. As an example, the elastic sheet may be a sheet-like structure that protrudes outward from the second housing and forms a certain angle with the horizontal plane of the second housing, the sheet-like structure can be elastically deformed so that one end thereof away from the horizontal plane of the second housing is elastically displaced in the vertical direction. Optionally, the magnet is coupled to the elastic sheet, and the coil is coupled to the fixed portion. When the coil vibrates under the action of the driving force, a relative motion of the coil and the magnet can be generated by the vibration of the magnet coupled to the elastic sheet. This structure allows both the magnet and the coil to be disposed on the second housing, thereby reducing the number of components of the exciter and reducing the complexity of the internal structure of the exciter.

Optionally, the fixed portion 401 is disposed at a central portion of the second housing 40, and the elastic sheet 402 is disposed on both sides of the fixed portion. Referring to FIG. 3, in the present disclosure, as the fixed portion is disposed at the central portion of the second housing and the elastic sheet is disposed on both sides of the fixed portion, the convenience of installing the coil and the magnet can be improved.

Optionally, two adjacent wires in the coil are adhered by adhesive.

As an embodiment of the present disclosure, for example, a thin layer of adhesive may be coated on a surface of a quadrangular wire 301, and two adjacent wires are connected and fixed by adhesive. After coil 30 is wound, the wires are arranged orderly and are not easy to scatter. Optionally, the thickness of the adhesive is negligible relative to the length or width of the cross section of the wire, i.e., the thickness of the adhesive is less than the length or width of the cross section of the wire. In this way, the advantages of the shape of the wire can be fully utilized, so as to reduce the interval between the wires.

Optionally, the exciter further includes a flexible circuit board disposed between the coil and the second housing.

As an embodiment of the present disclosure, the exciter further includes a flexible circuit board. The flexible circuit board is used to electrically connect a circuit or a power supply device other than the coil and the exciter to apply an electric signal into the coil. Optionally, other circuit components may also be integrated on the flexible circuit board. As an example, the flexible circuit board may be disposed between the coil and the second housing. That is, the flexible circuit board is coupled to the second housing, and the coil is coupled to a side of the flexible circuit board away from the second housing. In this embodiment, not only the convenience of connecting the flexible circuit board and the second housing is improved, but also the electrical connection structure between the coil and the flexible circuit board can be simplified. Optionally, the flexible circuit board may be coupled to the fixed portion of the second housing, and the coil is coupled to the flexible circuit board. Connecting the flexible circuit board to the fixed portion can avoid interference between the flexible circuit board and the magnet.

The present disclosure also provides an electronic product. The electronic product includes the exciter as described above, and further includes a product body, the product body divided into a fixed member and a vibrating member, wherein one of the first housing and the second housing is coupled to the vibrating member, and the other one of the first housing and the second housing is coupled to the fixed member, and wherein the vibrating member is configured to be capable of vibrating relative to the fixed member. The vibrating member may be a screen and a back cover of the electronic product for vibration and sound generating (the following description is illustrated by taking the screen as an example). The fixed portion is a part of the structure of the product body, and the fixed portion may be a middle frame, a side wall, a PCB, or other structures of the product body. In the product body, structural components such as partitions and middle frames are commonly disposed in order to place other electronic devices. These structural components have good structural stability in electronic products, they are used to place electronic devices and protect the electronic devices. Therefore, by using such structural components in the product body as the fixed member, the vibration reliability can be improved.

The exciter is disposed in the product body. The electronic product may be a mobile phone, a tablet computer, etc., which is not limited in the present disclosure. The screen is disposed on the product body and is used as a display screen of the electronic product. The screen is driven to vibrate and sound through the interaction between the coil and the magnetic component.

In the present disclosure, the coil is formed by winding the prismatic wire, the length of the wire is increased, and the driving force generated from the coil is increased, which is conducive to increasing the vibration amplitude of the coil, thereby improving the loudness of the sound signal from the electronic product.

In the present disclosure, the coil wire has a rectangular cross section, so that the interval between the wires can be reduced in the wound coil, the number of turns of the coil can be maximized in the same space, the effective length of the coil can be increased, and the driving force generated from the coil can be increased, the vibration performance of the exciter can be improved. Meanwhile, the magnets arranged in pairs can increase the magnetic field strength and correct the magnetic lines of force, so that the magnetic induction lines pass through the coil vertically to improve the driving force of the magnet on the coil. Multiple pairs of magnets can increase the magnetic field strength, and on the other hand, the distance between the two pairs of magnets is less than or equal to the height of the winding hole in the vertical direction, which can ensure that the magnetic induction lines pass through the parts with wires on the winding plane, which ensures the effective area of the coil interacting with the magnet, thereby increasing the driving force on the coil. In addition, two adjacent wires are connected and fixed by adhesive, which can improve the structural stability of the coil and prevent the wires from loosing.

Although some specific embodiments of the present disclosure have been described in detail by way of examples, those skilled in the art should understand that the above examples are provided for illustration only and not for the purpose of limiting the scope of the present disclosure. Those skilled in the art will appreciate that modifications may be made to the above embodiments without departing from the scope and spirit of the present disclosure. The scope of the invention is defined by the appended claims.

What is claimed is:

1. An exciter, comprising:

a magnetic circuit assembly comprising a first housing and a magnet, and the magnet is coupled to the first housing; and a coil assembly comprising a second housing and a coil, and the coil is disposed in a magnetic field formed by the magnet, wherein the coil is coupled to the second housing, wherein the coil assembly is configured to generate a vibration relative to the magnetic circuit assembly, wherein the coil is formed by winding a wire having a polygonal cross section, wherein the magnet is provided in pairs, and magnetization directions of two magnets in each pair of magnets are the same as each other, wherein two pairs of magnets are arranged along a vibration direction of the coil assembly, and magnetization directions of the two pairs of magnets are opposite to each other to form a magnetic circuit, wherein an elastic sheet is provided on the second housing, and wherein the magnet is coupled to the elastic sheet, and wherein the elastic sheet is a sheet-like structure that protrudes outward from the second housing and forms a certain angle with an upper surface of the second housing.

2. The exciter of claim 1, wherein the wire has a rectangular cross section.

3. The exciter of claim 2, wherein the wire has square cross section.

4. The exciter of claim 1, wherein in the vibration direction of the coil assembly, a spacing between the two pairs of magnets is less than or equal to a height of a winding hole of the coil in the vibration direction.

5. The exciter of claim 1, wherein the elastic sheet is integrally formed with the second housing.

6. The exciter of claim 1, wherein two adjacent wires in the coil are adhered by adhesive.

7. An electronic product, comprising:

the exciter of claim 1;

a fixed member;

a vibrating member configured to vibrate relative to the fixed member, wherein one of the first housing and the second housing is coupled to the vibrating member, and the other one of the first housing and the second housing is coupled to the fixed member.

* * * * *